United States Patent [19]
Klemen

[11] Patent Number: 6,033,042
[45] Date of Patent: Mar. 7, 2000

[54] VEHICLE BRAKE SYSTEM WITH POWERTRAIN DYNAMIC BRAKING

[75] Inventor: Donald Klemen, Carmel, Ind.

[73] Assignee: General Motors Corporation, Detroit, Mich.

[21] Appl. No.: 09/034,429

[22] Filed: Mar. 3, 1998

[51] Int. Cl.[7] .................................................. B60T 13/66
[52] U.S. Cl. ........................... 303/152; 303/20; 188/173
[58] Field of Search ................... 303/20, 152; 188/171, 188/173, 329, 330; 180/65.3, 65.4

[56] References Cited

U.S. PATENT DOCUMENTS

| | | | |
|---|---|---|---|
| 4,231,452 | 11/1980 | Kraft | 188/171 |
| 4,671,577 | 6/1987 | Woods | 303/20 |
| 4,787,484 | 11/1988 | Webb | 188/171 |
| 4,981,200 | 1/1991 | Gee | 188/329 |
| 5,318,142 | 6/1994 | Bates et al. | 180/65.3 |
| 5,431,607 | 7/1995 | Alder et al. | 180/65.4 |
| 5,486,039 | 1/1996 | Petiot | 303/3 |
| 5,511,859 | 4/1996 | Kade et al. | 303/3 |
| 5,542,754 | 8/1996 | Aoki et al. | 303/152 |
| 5,573,312 | 11/1996 | Muller et al. | 303/152 |
| 5,615,933 | 4/1997 | Kidston et al. | 303/3 |
| 5,637,987 | 6/1997 | Fattic et al. | 180/65.3 |
| 5,746,283 | 5/1998 | Brighton | 180/64.4 |

*Primary Examiner*—Paul N. Dickson
*Assistant Examiner*—Thomas J. Williams
*Attorney, Agent, or Firm*—Dean L. Ellis; Donald F. Scherer

[57] ABSTRACT

A friction brake system in a vehicle has a spring apply force, a pressure release force and a solenoid release force. The solenoid release force is determined by the electrical dynamic brake capacity available at the vehicle powertrain. Under full braking conditions, when the electric dynamic brake absorption capacity is high, the solenoid release force is high and vice versa. The overall brake force requested is established by an operator input signal. The amount of dynamic braking, the amount of pressure release force and the amount of spring apply force are determined by the requested braking effort from the operator and the amount of dynamic braking that can be absorbed in an energy storage unit associated with the powertrain.

6 Claims, 1 Drawing Sheet

VEHICLE BRAKE SYSTEM WITH POWERTRAIN DYNAMIC BRAKING

TECHNICAL FIELD

This invention relates to vehicle brake systems.

BACKGROUND OF THE INVENTION

Historically, many operating conditions provide unfavorable braking situations. When an assist device, such as a dynamic retarder or energy storage device is utilized, the device can change the vehicle brake proportioning resulting in braking variations if the assist is rapidly reduced or fully satisfied. This variation in braking torque can result in the operator sensing necessity for more braking effort thereby applying more energy to the brake pedal. This can cause stoppage of the vehicle more rapidly than the driver had intended.

In regenerative energy recovery systems in an electric or hybrid powertrain, the driver feel of the braking system can be affected by the storage device energy level. That is, the charge of the storage battery's electrical system or perhaps the energy in the flywheel or an accumulator and other systems. Weather conditions and system thermal conditions can also affect the braking feel of the driver.

Since the regeneration of energy is applied to one axle in a power system, the brake balance between a front axle and a rear axle can be affected. If the regeneration recovery system has a discontinuing condition, the resultant difference in brake torque at the axle can be perceived by operator as a loss in braking effort although the brake system is functioning quite well. The regeneration storage systems are an assist mechanism to improve fuel economy by recovering the maximum available potential and kinetic energies.

To make maximum use of such systems, the driver must be provided with a system in which the regenerative storage braking mechanism is transparent during all operating conditions of the vehicle that might occur.

SUMMARY OF THE INVENTION

It is an object of this invention to provide an improved braking system in a vehicle with a hybrid powertrain having dynamic braking.

In one aspect of the invention, the total brake actuation force is satisfied, in part, by the amount of dynamic braking available.

In another aspect of the invention, the brake actuation force is the sum of a mechanical input force and electric input force.

In yet another aspect of the invention, the electric input force is provided by a solenoid mechanism which is in opposition to the mechanical input force.

In a further aspect of the invention, the solenoid mechanism provides the input force in accordance with the amount of dynamic energy absorption torque available.

DESCRIPTION OF AN EXEMPLARY EMBODIMENT

Figure 1:
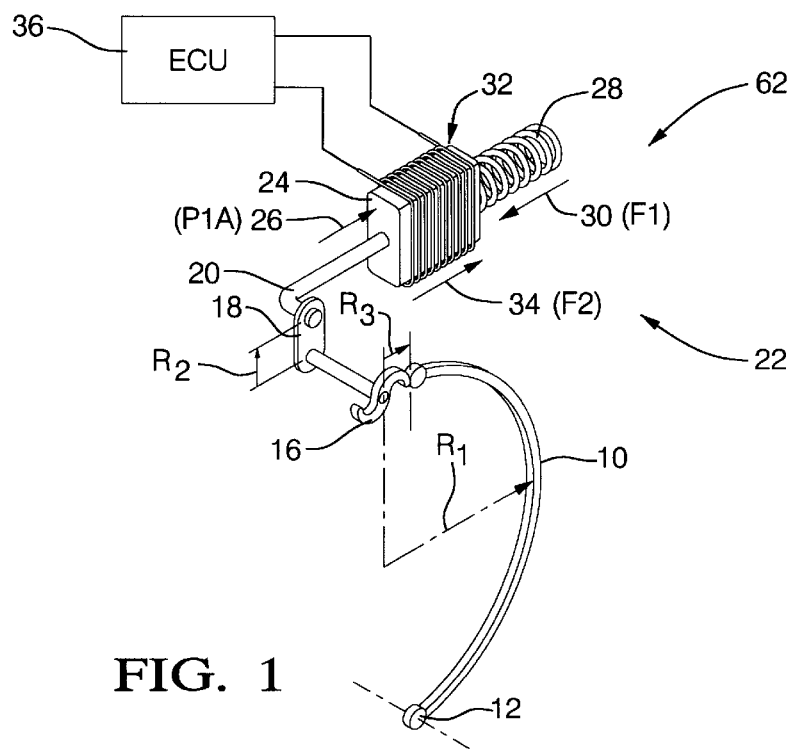
FIG. 1 is a diagrammatic representation of a portion of a vehicle brake system.
Figure 2:
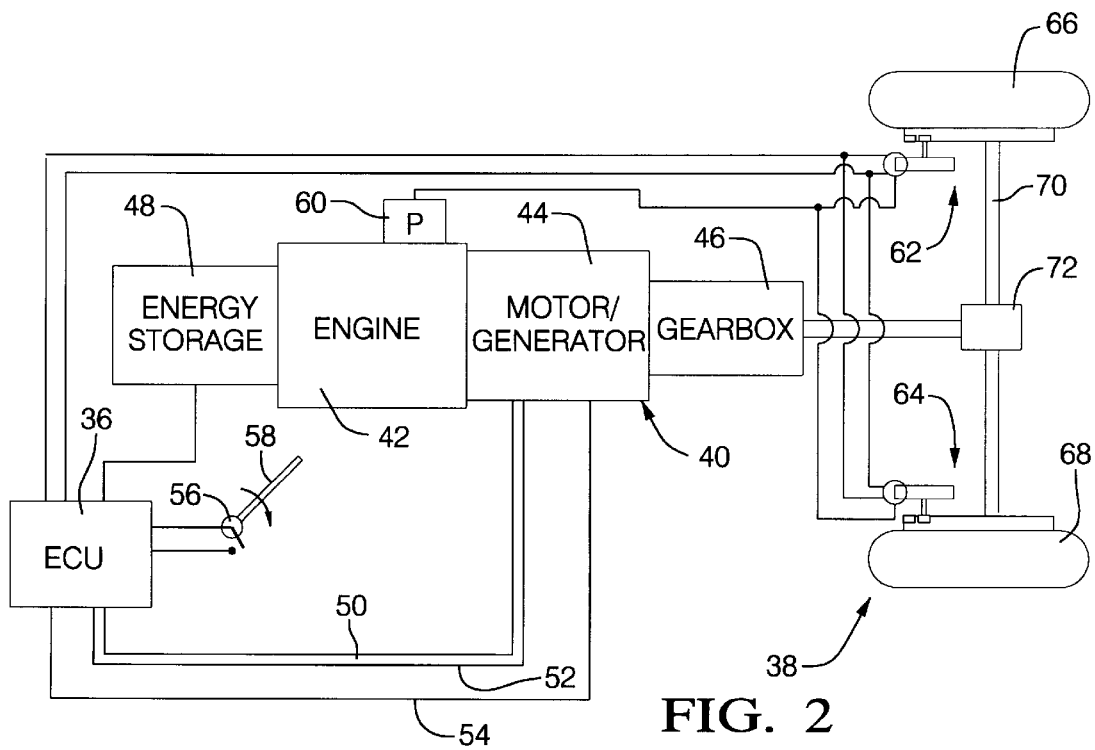
FIG. 2 is a diagrammatic representation of a vehicle having a hybrid powertrain and incorporating a braking system in accordance with the present invention.

As seen in FIGS. 1 and 2, a vehicle brake system 62 includes a brake shoe 10 pivotally mounted on an axis 12 having a radius R1. The brake system 62 will, of course, have opposed pairs of shoes which will engage a drum, not shown, housed within one of the wheels of the vehicle. Also, the brakes will be applied to two or more wheels on the same axle.

The brake shoe 10 is actuated about the axis 12 by an apply cam 16 which has a variable radius R3. The apply cam 16 is rotated through an actuator arm 18 which has a radius R2. The actuator arm 18 is manipulated by a plunger rod 20 which is a component of a brake apply mechanism 22. The plunger rod 20 is connected with a conventional piston, not shown, slidably disposed within a housing or body 24. The piston has applied thereto air pressure which presents the force P1A in the direction of arrow 26. The piston also has operating thereon an apply spring 28 which applies a force F1 in the direction of arrow 30.

Surrounding the body 24 or otherwise disposed therein is a solenoid 32 which applies a solenoid force F2 in the direction of arrow 34. Thus, as seen in FIG. 1, there are three forces that can be imposed on the plunger rod 20 thereby effecting the actuation of the brake shoe 10. The apply spring 28 applies the force F1 in a direction to engage the brake system of the vehicle while the solenoid force in F2 and pressure force P1A are in a direction to release the brakes. The spring force F1 and solenoid force F2 can, of course, be applied in the opposite direction, and if hydraulic type brake actuation is utilized, a hydraulic force would replace spring force.

The solenoid 32 is controlled by an electronic control unit (ECU) 36. The electronic control unit, which can include a conventional programmable digital computer, receives various input signals as seen best in FIG. 2. In FIG. 2, there is shown a vehicle generally designated 38 having a hybrid powertrain 40. The powertrain 40 includes an engine 42, a motor/generator 44 and a gearbox 46. The motor/generator 44 can also be a pair of motor/generators and the gearbox 46 can provide a plurality of planetary gearsets. One such hybrid powertrain can be seen in U.S. Pat. No. 5,558,588 issued to Schmidt on Sep. 24, 1996, and assigned to the assignee of the present application.

With this type of hybrid power transmission, it is well known that electro-dynamic braking is available by utilizing the motor/generator to recharge a set of batteries, which during driving mode, provide some of the power for vehicle operation. The hybrid powertrain can also utilize a hydromechanical transmission, such that the regenerative braking occurs through the use of either an accumulator or a mechanical flywheel. It is also possible to use a mechanical flywheel with the electro-mechanical powertrain 40 which is shown. However, it is generally recognized that the electro-dynamic braking is preferred when storage batteries are utilized. The storage batteries of the present invention are designated as energy storage at 48.

The amount of power distributed to and taken from the energy storage is controlled by the ECU 36. The rate at which energy is stored in or retrieved from the energy storage 48 as well as the capacity available is known or can be determined by the ECU 36. The ECU 36 receives torque signals 50 and 52 from the motor/generator 44 and a heat or thermal signal 54 from the motor/generator 44. The ECU 36 also receives an operator input signal from a potentiometer 56 operated by a brake pedal 58. A further signal is received at ECU 36 from a pump 60 which also distributes pressurized fluid to the brake system shown at 62 and 64. The brake systems 62 and 64 operate on wheels 66 and 68 which are interconnected by a conventional axle 70. The axle 70 is connected through a conventional differential 72 to the gearbox 46 or the output of the hybrid powertrain 40.

In the following description, these terms will be utilized:

T1 equals axle torque

T2 equals electric motor torque

R1 equals brake shoe radius

R2 equals actuator arm radius

R3 equals apply cam radius u equals the coefficient of dynamic friction of brake shoe 10

F1 equals the spring apply force

P1 equals fluid pressure from pump 60

P1A equals the pressure release force

A equals the working area in the air pressure chamber

F2 equals the solenoid force

G1 equals the transmission gear ratio

G2 equals the axle gear ratio

P2 equals brake seating pressure required to stroke pads to contact drum

F3 equals the net plunger force on the rod 20 which provides the brake apply force;

K1 is a constant which is a function of R1, R2, R3 and u

K2 is a constant which is a function of G1 and G2

K3 is a constant which is a function of K1 and K2

The axle torque without regeneration and energy storage can be determined in accordance with the following:

$$T1=(F1-P1A)*K1$$

The axle torque with regeneration energy storage can be determined with the following equation:

$$T1=(F1-P1A-F2)* K1+T2*K2$$

Therefore, it should be recognized that the axle torque with regeneration is dependent upon the apply forces of the mechanical braking system as well as the torque available for regeneration as established by the motor/generators 44.

For the axle torque without regeneration to be equal to the axle torque with regeneration, the two equals are set equal and the following equation is the result:

$$T2*K2-F2*K1=0$$

This equation can be rearranged and written in terms of the force F2 of the solenoid 32. That is, F2=T2*K3. Therefore, it can be seen that the solenoid force is proportional to the regeneration torque at the electric motor. Thus the ECU 36 will increase the solenoid release force when the amount of the regenerative torque that can be absorbed by the energy storage 48 increases and vice-versa.

It is desirable to ensure that the brake shoes 10 are seated against the brake drum when a braking force is called for by the operator through manipulation of the brake pedal 58. A value equal to the seating pressure P2 can be determined by manipulating the equations as follows:

$$F3=F1-P1*A-F2$$

$$F3=P2*A$$

By substituting the value P2*A for F3 in the equation for net plunger force F3 and rearranging the terms, the equation can be written as:

$$P2=(F1-P1A-F2)/A$$

This provides the starting point for the seating pressure for the brake system. There may, in some cases, be some experimentation necessary to provide the maximum pressure desired by engineering evaluation which will establish the most efficient brake seating load. A pressure which will result in positive pad contact, but low losses and heating on long grades, is desirable and should be the final seating pressure P2.

The seating pressure equation can also be written as follows:

$$F2=F1-(P1+P2)*A$$

This, of course, can be rewritten as:

$$P2=[(F1-F2)/A]-P1$$

These two equations show that if the solenoid force F2 is maintained based on the requested air pressure, a desired seating pressure on the brake pads will be maintained.

To ensure full mechanical hill holding of the brakes when the vehicle comes to a stop, P2 is reduced to zero at a low wheel speed, approximately 25 rpm, and the brakes are applied by balancing air pressure force P1A against the apply spring force 28. When the vehicle comes to a complete stop, both the solenoid force F2 and the fluid pressure force P1A can be eliminated, such that the apply spring 28 will fully apply the brakes.

During normal braking, it is desirable to control the solenoid force in accordance with the torque condition of the motor/generator 44 and the electrical storage available at the energy storage 48. During dynamic braking, the torque condition of the motor/generator 44 and the charge level of the energy storage 48 is indicative of the amount of dynamic braking which is available. Motor/generator torque T2 can be written as follows:

$$T2=[F1-(P1+P2)*A]/K3$$

As is shown previously, T2 is a function of solenoid force F2. This provides a method to calculate regenerative torque as a function of line pressure and seating pressure. When the brake is applied, the pedal 58 will regulate the line pressure P1 and the system controller ECU 36 will determine both the motor torque T2 and the solenoid force F2 and apply them simultaneously to the system. Utilizing the above equation for T2, it should be recognized that F2=F1−(P1+P2)*A. That is, F2 is substituted for the term T2*K3.

In the operating system, the ECU 36 will, of course, recognize the changes of dynamic brake absorption and instantaneously, or within a very short period of time, establish the necessary pressure at the brake apply mechanism 22 which can compensate for the change in electro-dynamic braking, whether the electro-dynamic braking is increased or decreased dependent on the charge status and storage rate of the energy storage 48. This will be a very smooth blending of the control forces and will be transparent to the operator, such that a change in actuation of the pedal 58 will not be necessary unless the operator determines that more or less braking is necessary.

What is claimed is:

1. A vehicle brake mechanism comprising:

a friction brake member;

first means for enforcing engagement of said friction brake member;

a first apply means for applying a force on said first means to enforce engagement of said friction brake member;

electrically actuated means for controlling a force on said first means to urge disengagement of said friction brake member;

an electric propulsion motor driven by the vehicle during vehicle braking;

means for supplying an electric control signal to said electrically actuated means in accordance with a storage rate of an energy storage means during vehicle braking; and means for determining the torque at said electric propulsion motor for supplying an electric control signal to said electrically actuated means to effect the force thereof in accordance with the torque at said electric propulsion motor and the storage rate of said electric storage means.

2. The vehicle brake mechanism defined in claim 1 wherein said electrically actuated means comprises a solenoid having an energized condition to urge disengagement of said friction brake member.

3. The vehicle brake mechanism defined in claim 1 further comprising a fluid pressure means selectively acting on said first means for affecting the engagement enforcement thereof.

4. The vehicle brake mechanism defined in claim 2 further comprising a fluid pressure means selectively acting on said first means for affecting the engagement enforcement thereof.

5. A vehicle brake mechanism in a vehicle having a hybrid powertrain, said mechanism comprising:

a friction brake member;

first means for enforcing engagement of said friction brake member;

a first apply means for applying a force on said first means to enforce engagement of said friction brake member;

electrically actuated means for controlling a force on said first means to urge disengagement of said friction brake member;

an energy storage means for storing energy at a storage rate from the hybrid powertrain during vehicle braking; and means for supplying an electric control signal to said electrically actuated means to effect the force thereof in accordance with the storage rate of said energy storage means.

6. A vehicle brake mechanism comprising:

a friction brake member;

first means for enforcing engagement of said friction brake member;

a first apply means for applying a force on said first means to enforce engagement of said friction brake member;

electrically actuated means comprising a solenoid having an energized condition for controlling a force on said first means to urge disengagement of said friction brake member;

an electric propulsion motor driven by the vehicle during vehicle braking;

means for determining the torque at said electric propulsion motor for supplying an electric control signal to said electrically actuated means to effect the force thereof in accordance with the torque at said electric propulsion motor; and energy storage means for storing energy at a storage rate from the electric propulsion motor during vehicle braking, and wherein said torque determining means is responsive in part to said storage rate.

* * * * *